United States Patent

Van Heddegem

[15] 3,685,044

[45] Aug. 15, 1972

[54] SIGNAL SENSING ARRANGEMENT

[72] Inventor: Lucian H. E. Van Heddegem, Edegem, Belgium

[73] Assignee: International Standard Electric Corporation, New York, N.Y.

[22] Filed: Dec. 2, 1970

[21] Appl. No.: 94,470

[30] Foreign Application Priority Data

Dec. 15, 1969 Netherlands..............6918806

[52] U.S. Cl..........................340/347 DD, 340/166 C
[51] Int. Cl...............................................H04l 3/00
[58] Field of Search............340/347, 166 C, 174.1 B

[56] References Cited

UNITED STATES PATENTS

| | | |
|---|---|---|
| 3,305,838 | 2/1967 | Kidd et al................340/166 C |
| 3,505,659 | 4/1970 | Kelly....................340/347 DD |
| 3,540,031 | 11/1970 | Love....................340/347 DD |

*Primary Examiner*—Thomas A. Robinson
*Assistant Examiner*—Jeremiah Glassman
*Attorney*—C. Cornell Remsen, Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A signal sensing arrangement in a code translator for distinguishing signals at first points from noise caused by these signals at other points by gating the signals in gating circuits via a strobe pulse generator. Each of the first points is coupled to a separate gate via a shaping circuit designed to improve the signal-to-noise ratio. The strobe pulses are coupled to the other inputs to the gate circuits. The arrangement is capable of distinguishing between signal and noise even if the peak amplitudes of both occur substantially at the same time and/or the signal amplitude experiences rapid fall-off after peaking.

20 Claims, 5 Drawing Figures

Inventor
LUCIAAN H. E. VAN HEDDEGEM
By Mark L. Hopkins
Agent

SIGNAL SENSING ARRANGEMENT

BACKGROUND OF THE INVENTION

The present invention relates to a signal sensing arrangement to distinguish the appearance of signals at one or more points as distinct from noise caused by said signals at one or more other points, by gating said signals in gating circuits by means of a strobe pulse generated by a strobe pulse generator a predetermined time interval after the appearance of said signals.

Such a signal sensing arrangement is already known from the article "Design of memory sense amplifiers" by G.H. Goldstick and E.F. Klein, published in IRE Transactions on Electronic Computers, Apr. 1962 N° 2, pages 236–253, and also from the book "Square-loop ferrite circuitry" by C.J. Quartly published by Iliffe Books Ltd London, 1962, and more particularly from the chapter concerning "Output Amplifiers" on pages 101–104 thereof. According to the paragraph 3.3.2. concerning "Strobing" on page 30 of this book, the strobing operation should preferably be performed when the signal-to-noise ratio is a maximum, i.e., near the peak time of the signal by which time the noise amplitude has fallen to a low value. However, it is not always possible to proceed in this way since in certain cases the amplitudes of both the signal and noise go through their maximum substantially at the same time. It may moreover also happen that after having reached a maximum the amplitude of the signal decays very rapidly so that when the strobing operation would be performed after the amplitude of the signal has reached its maximum, the amplitude of the signal appearing at the output of the gating circuit would be too small to trigger a bistate device for instance.

SUMMARY OF THE INVENTION

It is therefore an object of the present invention to provide a signal sensing arrangement of the above type but which is capable of discriminating between signal and noise even when the amplitudes of these pulses go through their maximum substantially at the same time and when, moreover, the amplitude of the signal decreases very rapidly after having reached its maximum.

The present signal sensing arrangement is particularly characterized in that each of said points is coupled to one input of an individually associated gating circuit (T2, T3) via an individually associated signal shaping network (R10, C2, $rw50$) designed to increase the signal-to-noise ratio, said strobe pulse (SP) being applied to the other input of said gating circuit, the output of which is coupled to an output of the sensing arrangement.

In accordance with a preferred embodiment of the invention, the signal sensing arrangement forms part of a code translator which includes a matrix of magnetic cores through which a plurality of code wires are threaded, each code wire constituting the series connected primary windings of a plurality of transformers. The transformers each include a magnetic core and the secondary winding of each is wound on this magnetic core. Each secondary winding forms part of a sensing device which further includes a parallel resistance-capacitance circuit which is branched in parallel with said secondary winding and which is coupled to the base of one of two intercoupled transistors, the base of the other transistor being coupled to a strobe pulse generator, with the intercoupled collectors of these transistors constituting the output of the signal sensing device. All the sensing devices together form the signal sensing arrangement and the outputs of the signal sensing devices associated to a same column of magnetic cores are coupled to a same bistate device.

BRIEF DESCRIPTION OF THE DRAWINGS

The above mentioned and other objects and features of the invention will become more apparent and the invention itself will be best understood by referring to the following description of embodiments taken in conjunction with the accompanying drawings in which.

DESCRIPTION OF THE PREFERRED EMBODIMENT

Figure 1:
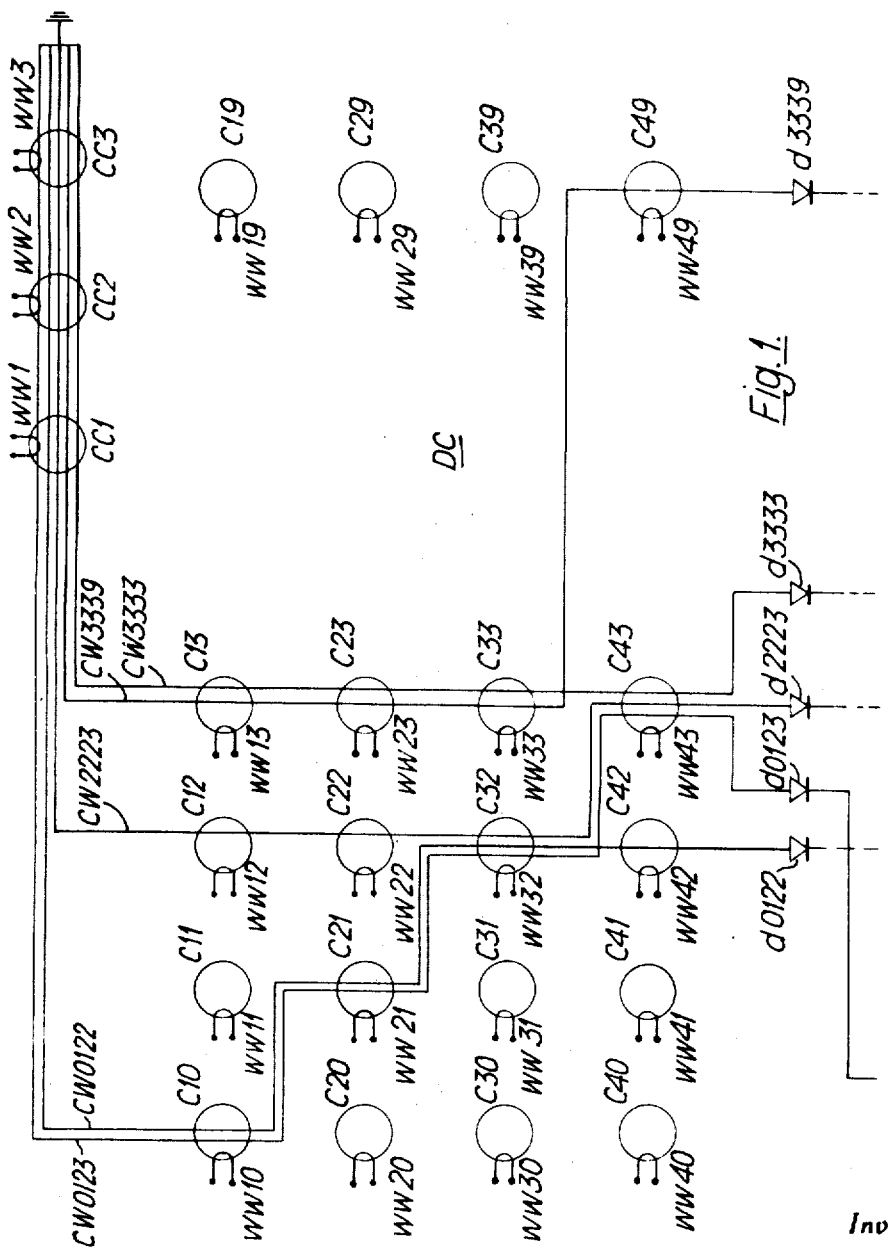
FIG. 1 shows a decoder circuit forming part of a code translator which includes a plurality of signal sensing devices constituting a signal sensing arrangement according to the invention.
Figure 2:
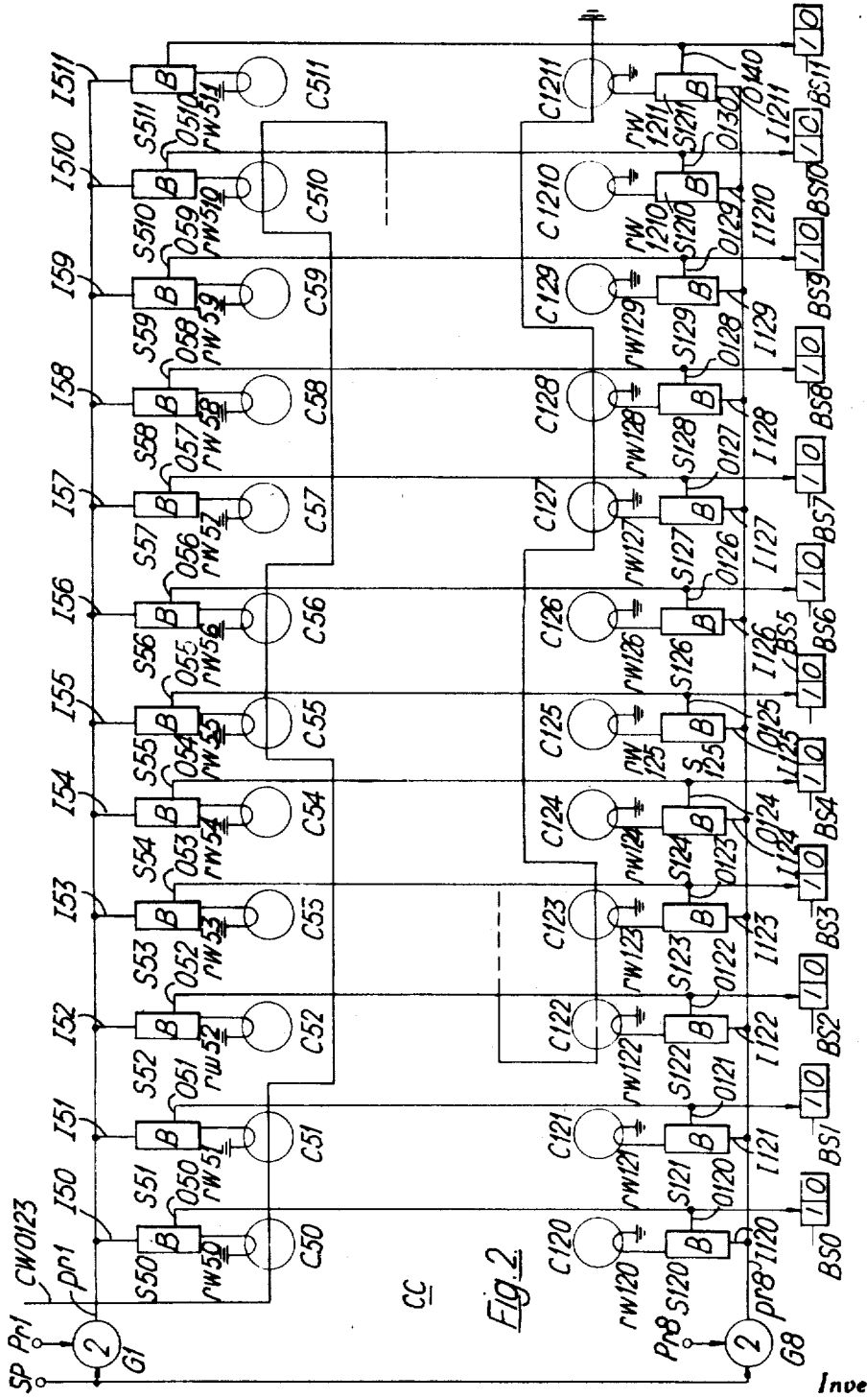
FIG. 2 represents a coder circuit also forming part of the translator.

Principally referring to FIG. 1 and 2, the former being arranged above the latter, the code translator shown therein is constituted by a decoder circuit DC (FIG. 1) and by a coder circuit CC (FIG. 2.).

This code translator forms part of an automatic letter sorter equipment and is adapted to translate so-called index codes printed on letters in 200 destination codes according to eight different programs More particularly, this code translator is adapted to first decode the index code in a 4 times 1-out-of-10 input code in the decoder circuit DC and to subsequently translate this input code in the coder circuit CC in a 5-out-of-12 output code constituted by two 2-out-of-5 codes followed by a 1-out-of-2 code.

The decoder circuit DC includes three magnetic transformer cores CC1, CC2 and CC3 and 40 magnetic transformer cores arranged in a matrix of four rows each including 10 magnetic cores C10 – C19 to C40 – C49. The coder circuit CC includes 96 magnetic transformer cores arranged in a matrix of eight rows each including 12 magnetic cores C50 – C511 to C120 – C1211. Each magnetic core, the cores CC1 to CC3 excepted, is indicated by the capital character C followed by a digit or number indicating the row to which the magnetic core belongs and by a digit or number indicating the rank of the core in this row. For instance, magnetic core C 1211 is located in row 12 and has rank 11. All magnetic cores are made of a magnetic material having a linear hysteresis loop.

Each of the magnetic cores CC1 to CC3 is provided with a primary or write winding $ww1$ to $ww3$ respectively, and each of the magnetic cores C10 to C49 is provided with a primary or write winding $ww10$ to $ww49$ respectively. Each of the write windings $ww1$ to $ww3$ and $ww10$ to $ww49$ is connected to an individual control circuit (not shown) forming part of a control arrangement (not shown) adapted to simultaneously apply a biasing voltage pulse to the three write windings $ww1$ to $ww3$ and an input voltage pulse to a combination of four write windings, one in each of the rows $ww10-ww19$ to $ww40-ww49$ respectively. Two thousand code wires the ends of which are grounded are each woven through the three magnetic cores CC1 to CC3 and through the decoder and coder matrices. Each code wire is threaded through one magnetic core of each of the rows of the decoder matrix and thus forms the series connected secondary windings of four transformers. Each code wire is moreover threaded through five magnetic cores of each of the eight rows of the coder matrix and hence forms the series connected primary windings of 40 transformers. More particularly, in each of the latter eight rows each code wire passes through 2 of the five magnetic cores C50–C54 to C120–C125, through 2 of the 5 magnetic cores C55–C59 to C125–C129 and finally through 1 of the two magnetic cores C510–C511 to C1210–1211. Each code wire further comprises a diode rectifier arranged between the decoder and coder matrices. It should be noted that each of the code wires is indicated by the characters "cw" followed by the ranks of the magnetic cores in the decoder matrix through which the code wire is threaded. For instance, code wire cw0122 passes through magnetic cores with ranks zero, one, two and two of rows one, two, three and four of the decoder matrix respectively. Each of the diode rectifiers is indicated by the character $d$ followed by the same number as the corresponding code wire. It should also be noted that a maximum of 10 000 code wires may be threaded through the magnetic cores.

The magnetic cores C50 to C1211 of the coder matrix are each provided with a secondary or read winding rw50 to rw1211 respectively. The one ends of these read windings rw50–rw1211 are grounded, whereas their other ends each constitute an input of a respective signal sensing device S50–S1211 respectively. The other inputs I50–I511 to I120–I1211 of the sensing devices S50–S511 to S120–S1211 are connected to the outputs pr1 to pr8 of the AND-gates G1 to G8 respectively. The outputs O50–O120, . . ., O511–O1211 of the sensing devices S50–S120, . . ., S511–S1211 belonging to a same column are joined and connected to the "1" input of a corresponding bistate device B50 to B511 respectively. The one inputs of the AND-gates G1 to G8 are connected in common to the output SP of a strobe pulse generator (not shown), and the other inputs of these gates are connected to a respective output Pr1–Pr8 of a row selector or program indicator (not shown).

Figure 3:
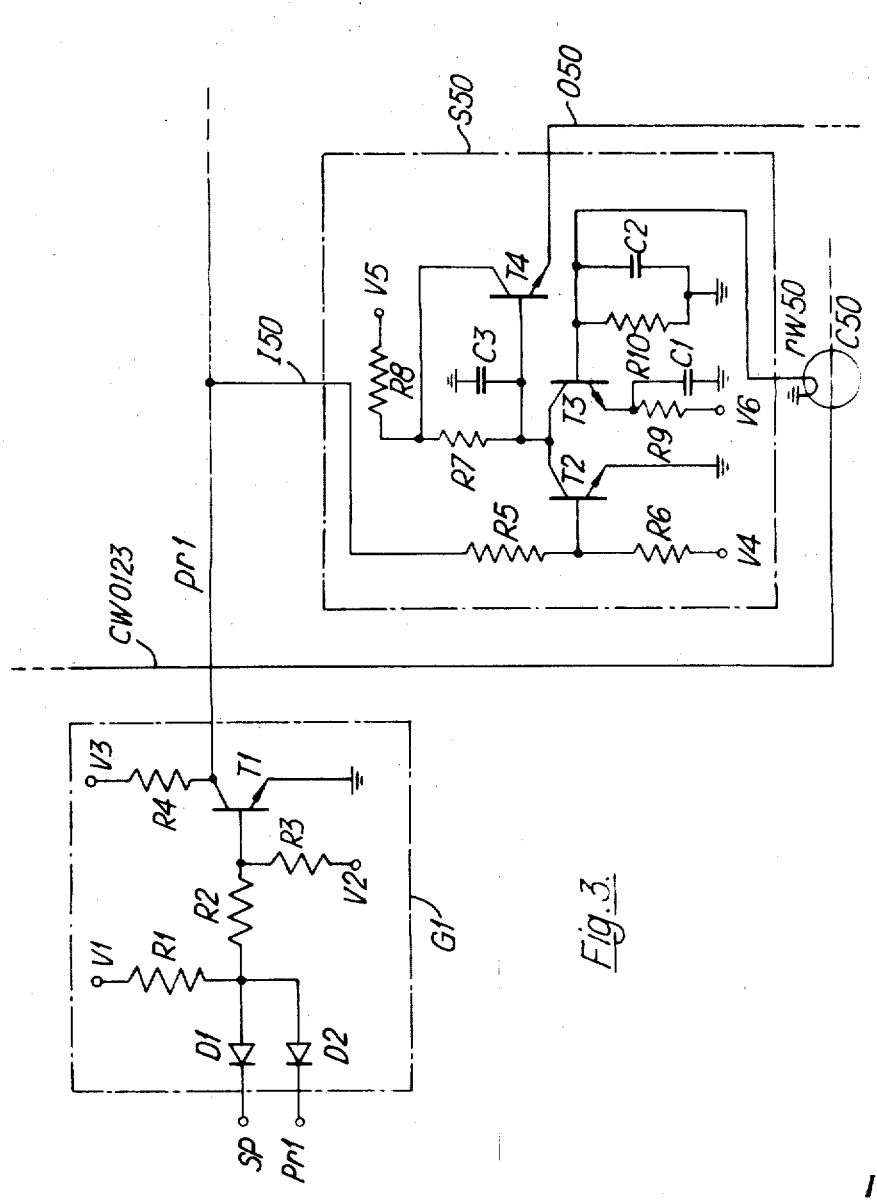
FIG. 3 shows part of FIG. 2 in detail.

Principally referring to FIG. 3, the AND-gate G1 shown therein includes a DC source V1 which is connected to the outputs SP and Pr1 via a common resistance R1 and the individual diode rectifiers D1 and D2 respectively. The junction point of the resistance R1 and the diode rectifiers D1 and D2 is connected to the base of the NPN transistor T1 via resistance R2, this base being connected to a DC source V2 via resistance R3. The collector of transistor T1 is connected to the DC source V3 via resistance R4, and its emitter is grounded. The collector of transistor T1 constitutes the output pr1 of gate G1 and is connected to the input I50 of the signal sensing device S50 and more particularly to the upper end of resistance R5 which is connected in series with resistance R6. The end of the latter resistance R6 away from resistance R5 is connected to DC source V4, while the junction point of these resistances R5 and R6 is connected to the base of NPN transistor T2. The emitter of transistor T2 is grounded and its collector is connected to that of the NPN transistor T3. The junction point of these two collectors is connected to the DC source V5 via the series connected resistances R7 and R8. The emitter of transistor T3 is connected to DC source V6 via resistance R9 and its base is connected to the one end of read winding rw50 of magnetic core C50, the other end of this winding being grounded. The emitter of transistor T3 is connected to ground via capacitor C1 and its base is grounded via resistance R10 and capacitor C2 in parallel, the elements R10 and C2 forming with the associated transformer windings rw50 signal shaping network and more particularly a ringing circuit. The joined collectors of the transistors T2 and T3 are also connected, on the one hand to ground via capacitor C3 and, on the other hand, to the base of the NPN transistor T4. The collector of this transistor T4 is connected to the junction points of resistors R7 and R8, and the emitter of this transistor T4 constitues the output O50 of the sensing device S50. The above mentioned code wire cw0123 is threaded through the magnetic core C50.

Each sensing device such as S50 may be considered as being formed by an AND-gating circuit mainly constituted by the transistors T2, T3 and by a signal shaping network such as R10, C2, rw50. The one input of this gating circuit is coupled via the shaping network to the secondary or read winding rw50 in which the signal is produced and the other input of this gating circuit is coupled to the strobe pulse generator. The 96 signal sensing devices S50 to S1211 together form the signal sensing arrangement.

Preferable values of the voltages V1 to V5, resistances R1 to R10 and capacitances C1 to C3 are as follows:

| V1: | 12 volts | R1: | 5.1 kilo-ohms | C1: | 120,000 pf. |
|---|---|---|---|---|---|
| V2: | −6 volts | R2: | 3.6 kilo-ohms | C2: | 15,000 pf. |
| V3: | 12 volts | R3: | 13 kilo-ohms | C3: | 100 pf. |
| V4: | −6 volts | R4: | .620 kilo-ohms | | |
| V5: | 12 volts | R5: | 20 kilo-ohms | | |
| V6: | −6 volts | R6: | 100 kilo-ohms | | |
| | | R7: | 10 kilo-ohms | | |
| | | R8: | 1.2 kilo-ohms | | |
| | | R9: | 3.9 kilo-ohms | | |
| | | R10: | 0.1 kilo-ohms | | |

With the above values and those of the output voltages of the strobe pulse generator and the program indicator (row selector), normally diode rectifiers D1 and D2 are conductive, transistor T1 is blocked, transistors T2 and T3 are conductive and transistor T4 is blocked. Hereby the joined collectors of the transistors T2 and T3 are applied to ground potential, as well by transistor T2 as by transistor T3.

It should further be noted that a code translator for a lettersorter equipment, including a decoder matrix and a coder matrix through which code wires each including a diode rectifier are woven, is already known from the article "Time-shared code translators for lettersorting equipment" by J.D. Andrews and P.L. Belcher, published in the P.O.E.E.J., Volume 55, Part 3, pages 173–178, of October 1962, and from U.S. Pat. No. 2,960,682 which concerns more particularly the decoder part of the code translator.

The operation of the above code translator is described hereinafter, it being supposed that an index code read on a letter is first decoded in the input code 0123 and then coded in a 5-out-of-12 output or destination code according to program Pr1. For this reason a positive program pulse (not shown) is first applied to the input Pr1 of AND-gate G1 ( FIG. 2,3) by the program indicator.

Figure 5:
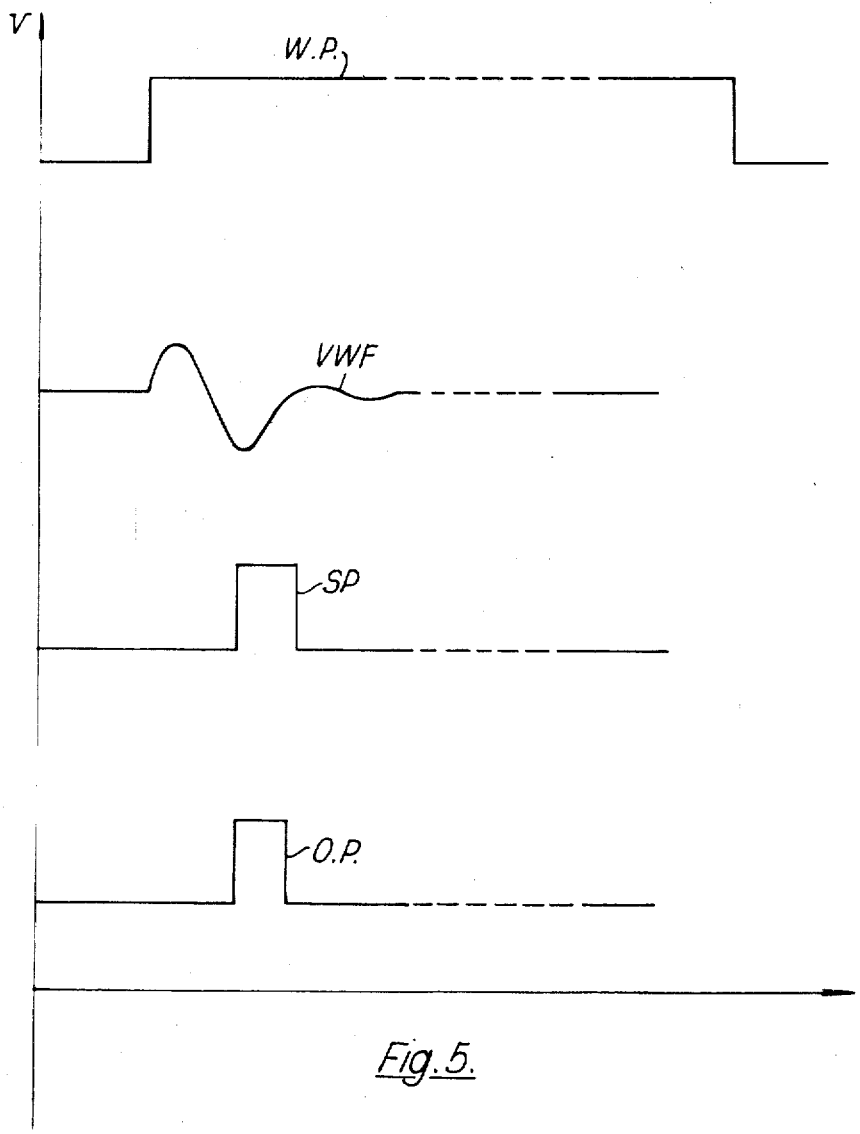

When the control circuits coupled to the write windings ww1 to ww3 of the magnetic cores CC1 to CC3 are subsequently operated, a negative biasing voltage pulse of magnitude E (not shown) is applied to each of these windings so that a resultant negative biassing voltage pulse of magnitude 3E is applied to each of the code wires threaded through these magnetic cores and more particularly to code wire cw0123. Simultaneously with the negative biassing voltage pulses, a positive writing voltage pulse with magnitude E (not shown) is applied to each of the windings of the combination of write windings ww10, ww21, ww32 and ww43 of the four magnetic cores C10, C21, C32 and C43 respectively through which the code wire cw0123 is threaded Consequently a resultant positive writing voltage pulse WP (FIG. 5) with magnitude E is applied to code wire cw0123 via the primary windings which are transformer coupled therewith. This code wire is thus selected since this write pulse induces in the latter code wire an input signal tending to deblock diode rectifier d0123. The resultant pulses applied to the primary windings coupled to the other code wires are zero or negative and the input signals induced in these code wires tend to block the respective diode rectifier, such as d0122, d2223, d3339. Indeed, these code wires are threaded through only zero, one, two or three of the above magnetic cores C10, C21, C32 and C43. In this way an excellent discrimination is obtained between the four times 1-out-of-10 code 0123 and the codes having a common digit with the latter code. This is known per se from the last mentioned U.S. Pat. No. 2,960,682.

Figure 4:
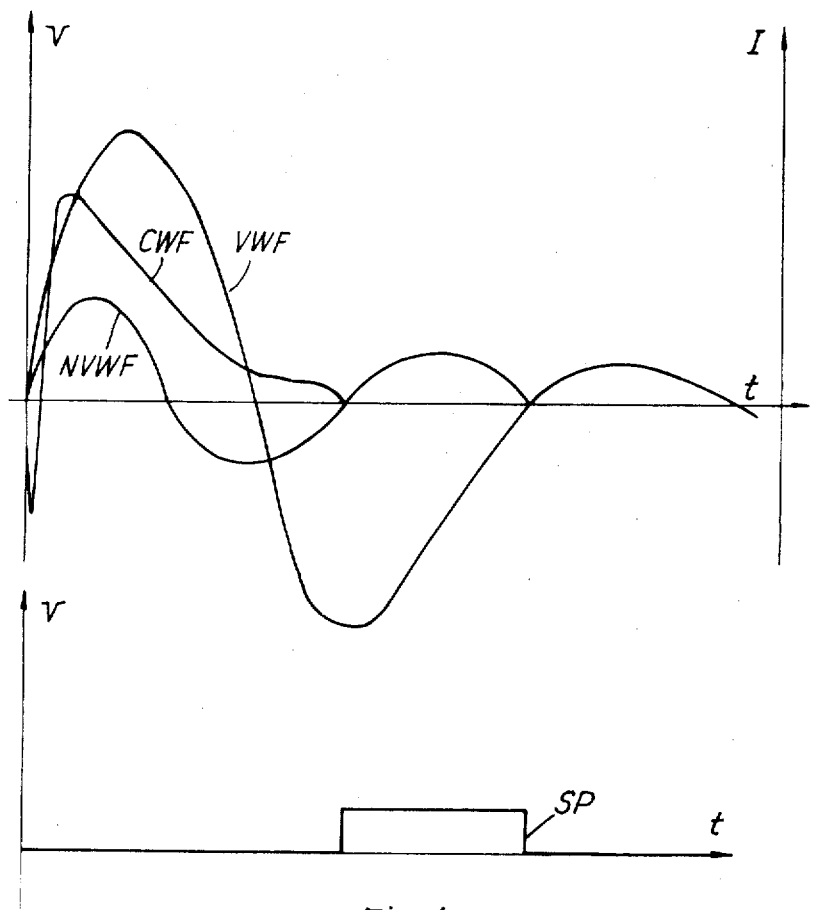
FIG. 4 and 5 show signal waveforms appearing in various points of the code translator.

The current waveform CWF of the input signal induced in the code wire cw0123 by the leading edge of the above resultant positive write pulse wp is shown in FIG. 4. This current waveform is obtained by a suitable choice of the characteristics of the 40 ringing or signal shaping circuits which are transformer coupled to the code wire cw0123 via read windings such as rw50, rw51, rw55, rw56, rw510, rw122, rw123, rw127, rw128 and rw1211 included in the corresponding sensing devices S50, S51, S55, S56, S510, S122, S123, S127, S128 and S1211 respectively. The current waveform CWF is unidirectional due to the presence of diode rectifier d0123.

Due to the presence of a ringing or signal shaping network such as R10, C2, rw50, the voltage waveform VWF of the signal appearing in each of the 40 read windings, of the above 40 sensing devices, which are transformer coupled to the selected code wire cw0123, is an underdamped oscillating waveform, also schematically represented in FIG. 4.

It should be noted that although in each of the last mentioned sensing devices the transistor T2 is normally conductive and grounds the joined collectors of the transistors T2 and T3 forming a gating circuit, an underdamped oscillating voltage waveform can be generated by the ringing or shaping circuit included therein due to the fact that both the inputs of the gating circuit T2, T3 are decoupled from one another.

The positive voltage portions of this underdamped oscillating voltage waveform VWF tend to make transistor T3 more conductive and are hence without importance, while the negative voltage portion thereof tends to block the latter transistor T3. Hereby, it should be noted that in order to block transistor T3 the applied negative voltage should be larger than a predetermined threshold value which may be adjusted by means of capacitor C1.

Although the negative voltage portion of the oscillating voltage waveform VWF is eventually to block transistor T3 included in each of the 40 sensing devices such as S50, S51, S55, S56, S510, S122, S123, S127, S128 and S1211, it can have no effect on the outputs of the sensing devices which are associated to the non-selected programs Pr2 to Pr8 since in these sensing devices the transistor T2 is maintained in the conductive condition.

The negative portion of the oscillating voltage waveform VWF can also have no effect on the output of the sensing devices S50, S51, S55, S56 and S510 belonging to the program Pr1 (the row selected) as long as the strobe input SP of AND-gate G1 is deactuated and even when its value exceeds that of the negative threshold, as is supposed. Substantially starting from the peak value and until the end of the above negative voltage portion of the voltage waveform VWF, the strobe pulse generator applies a positive strobe pulse (FIGS. 4 and 5) to the input SP of the AND-gate G1. Consequently both diode rectifiers D1 and D2 are blocked so that transistor T1 is temporarily made conductive, hereby temporarily activating all the one inputs of the gating circuits included in the sensing devices S50 to S511 associated to the program Pr1 selected. In each of these gating circuits the transistor T2 is temporarily cut-off by the negative pulse appearing at the collector of transistor T1. The temporarily cut-off transistor T2 has however no influence on the output of the sensing devices, associated to the program Pr1, which are not coupled to the selected code wire cw0123 since in these devices the transistor T3 is still conductive.

However, in each of the sensing devices S50, S51, S55, S56 and S510 due to both transistors T2 and T3 being temporarily cut-off an amplified positive output pulse appears at the joined collectors of the transistors T2 and T3. This pulse temporarily renders conductive the associated transistor T4 which is branched in an emitter-follower configuration, and the output pulse OP (FIG. 5) subsequently appearing at the emitter of this transistor T4 triggers to its 1-condition a corresponding one of the bistate devices BS0–BS11. Hence the bistate devices BS0, BS1, BS5, BS6 and BS10 are triggered to their 1-condition, so that the destination code 110,001,100,010 is registered in the bistate devices BS0 to BS11.

An underdamped oscillating voltage waveform (not shown) is also produced at the moment of occurrence of the trailing edge of the write pulses WP applied to the primary windings of the decoder circuit. But this voltage waveform has no effect on the sensing devices since it is not strobed by a strobe pulse.

In FIG. 4 the noise voltage waveform NVWF is shown which is induced in the read winding wound on a magnetic core through which the selected code wire cw0123 is not woven. Since the amplitude of this waveform is positive and small during the strobing interval it can have no effect on the conductive condition of the transistor T3 of the sensing device coupled to this read winding even if the transistor T2 of this sensing device is cut-off as is the case for the sensing devices belonging to the selected row.

If for some reason the strobe pulse is shifted somewhat to the left in FIG. 4, so as to overlap part of the negative going portion of the noise voltage waveform where the negative amplitude of the noise voltage is larger than the threshold value, there may appear a spurious signal at the joined collectors of the transistors T2, T3 of the sensing devices which belong to the selected row but which are not coupled with the selected code wire cw0123. In order to prevent this spurious signal from making transistor T4 temporarily conductive there is provided capacitor C3 which constitutes with resistor R7 a circuit decreasing the amplitude of the spurious signal to a value insufficient to operate transistor T4.

The noise is probably due to the fact that the diode rectifiers included in the code wires have a parasitic capacity so that a current will flow in all the non-selected code wires which are threaded through the magnetic cores CC1 to CC3 and through zero, one, two or three of the magnetic cores C10, C21, C32 and C43 upon write pulses being applied to the write windings wound or these magnetic cores. All the currents flowing through the large number of code wires threaded through each of the magnetic cores induce noise in the secondary winding wound on this core and obviously the noise increases with the number of code wires threaded through each magnetic core. The noise is also due to the fact that the selected code wire is coupled with a plurality of non-selected code wires and is able to induce therein voltages which may be sufficient to deblock the corresponding diode rectifiers.

In the above described coder circuit a signal sensing device is associated to each of the constituent magnetic cores of this circuit instead of being used in common for a column of magnetic cores, as is usual practice. This has been done to do away with additional noise introduced by the different lengths of wires which are then required to interconnect the secondary windings wound on the magnetic cores of the column and the common sensing device.

While the principles of the invention have been described above in connection with specific apparatus, it is to be clearly understood that this description is made only by way of example and not as a limitation on the scope of the invention.

I claim:

1. In a code transmitter, an improved signal sensing arrangement comprising:
  a. a plurality of code wires;
  b. a matrix of controlled magnetic cores through which said plurality of code wires are threaded as secondary windings;
  c. each code wire constitutes the series connected primary windings of a plurality of transformers, the transformers each including a magnetic core with the secondary winding of each being wound on the associated magnetic core;
  d. a plurality of signal sensing devices, of which each said secondary winding forms a part, each said sensing device including a gating circuit having a pair of collector-intercoupled transistors, and a parallel RC circuit branched in parallel with said secondary winding associated therewith and coupled to the base of one of said pair of transistors, wherein the interconnected collectors constitute the output of each signal sensing device; and
  e. a strobe pulse generator the output of which is coupled to the base of the other of said pair of transistors.

2. In a code translator having decoder and coder arrangements, an improved signal sensing arrangement capable of distinguishing, at a plurality of first points representative of a plurality of connections between said decoder and coder, information signals from the noise at said first points which is caused to be generated by said information signals in said code translator at second points, wherein the improvement comprises:
  a. a strobe pulse generator for providing strobe pulses in predetermined time relation to the presence of information signals;
  b. signal shaping means, coupled to said first points, for improving the signal-to-noise ratio at said first points, including an individual signal shaping circuit associated in one-to-one correspondence with each of said first points; and
  c. gating circuit means including a plurality of gating circuits, each coupled by way of a first input to said source of strobe pulses and individually coupled by way of a second input to one of said shaping circuits, for providing, in conjunction with said strobe generator and said shaping circuit means, a capability of discriminating between information signals and noise at said first points even if the peak amplitudes of both signals and noise occur substantially at the same time and/or the signal amplitude experiences decay after peaking, each of said plurality of gating circuits having its output coupled to an output of the sensing arrangement.

3. The signal sensing arrangement according to claim 24 wherein said first and second inputs of each said gating circuit are isolated from one another.

4. The signal sensing arrangement according to claim 3 wherein said signal shaping network is arranged to provide an underdamped oscillating waveform from said information signal.

5. The signal sensing arrangement according to claim 4 wherein said strobe pulse generator provides a strobe output pulse substantially entirely during the second half period of said underdamped oscillating waveform and substantially starting from the peak value of this half period.

6. The signal sensing arrangement according to claim 2 wherein each of said gating circuits includes a pair of transistors, the bases of which constitute said first and second inputs and the collectors of which are joined and are coupled to said output of the gating circuit.

7. The signal sensing arrangement according to claim 6 wherein said signal shaping network is constituted by a parallel circuit having three branches which in turn are constituted by a resistance, a capacitance and an inductance respectively.

8. The signal sensing arrangement according to claim 7 wherein said parallel circuit is branched between said base of one of said pair of transistors comprising a gating circuit and a first DC source (ground).

9. The signal sensing arrangement according to claim 8 wherein the emitter of said one transistor is coupled to said first DC source via a second capacitance and to a second DC source via a second resistance.

10. The signal sensing arrangement according to claim 8 wherein the joined collectors of said pair of transistors are connected to a third DC source via a third resistance and to said first DC source via a third capacitor.

11. The signal sensing arrangement according to claim 6 wherein both of said pair of transistors are normally conductive and connect said joined collectors to a potential substantially equal to that of said first DC source.

12. The signal sensing arrangement according to claim 10 wherein said joined collectors are connected to the base of a third transistor, the collector of which is connected to a tapping point of said third resistance and the emitter of which constitutes the output of said gating circuit.

13. The signal sensing arrangement according to claim 7 wherein each of said first signal points is represented by the secondary winding of a transformer, this secondary winding being coupled to the signal shaping network associated to this point.

14. The signal sensing arrangement according to claim 13 wherein said inductance is constituted by said secondary winding of said transformer.

15. The signal sensing arrangement according to claim 14 wherein said transformer has a single secondary winding and a plurality of primary windings each branched in series with a diode rectifier.

16. The signal sensing arrangement according to claim 15 wherein said signal sensing arrangement includes a plurality of said transformers, the primary windings of which are arranged in a plurality of sets, with the primary windings of each set being connected in series with one said diode rectifier so as to form a code wire.

17. The signal sensing arrangement according to claim 16 wherein said transformers are arranged in a two-coordinate matrix of rows and columns, the outputs of said gating circuits associated to the transformers of each column being coupled to the input of a common bistate device, and wherein the output of said strobe pulse generator is connected to the one input of each of a plurality of second gating circuits, each associated to a respective one of said rows, the other inputs of said second gating circuits being controlled by a row selector, the outputs of these second gating circuits being each connected to a respective one of said other inputs of the first gating circuits of the row to which the second gating circuit is associated.

18. The signal sensing arrangement according to claim 17 wherein said two-coordinate matrix of transformers constitutes the coder circuit of the code translator the decoder circuit of which is constituted by a plurality of second transformers, each with one primary winding and a plurality of secondary windings, the primary windings of said second transformers being each coupled to an individual control circuit and the secondary windings of said second transformers being arranged in a plurality of sets, wherein the secondary windings of each such set are connected in series and form part of a distinct one of said code wires the diode rectifier of which is arranged between said decoder and coder circuits, all code wires being coupled via a third transformer to a common bias pulse source which normally blocks all diode rectifiers, and wherein said decoder circuit includes means for simultaneously operating the control circuits coupled to the primary windings of said second and third transformers, the secondary windings of which form part of a same code wire in such a manner that only in this code wire the diode rectifier is deblocked.

19. The signal sensing arrangement according to claim 18 wherein said second transformers are arranged in a second two-coordinate matrix of rows and columns.

20. The signal sensing arrangement according to claim 19, wherein said code translator forms part of a letter sorter apparatus, and wherein each of said rows of said coder circuit corresponds to a sorting program capable of being selected by said row selector.

* * * * *